US011657302B2

(12) United States Patent
Dasgupta et al.

(10) Patent No.: US 11,657,302 B2
(45) Date of Patent: May 23, 2023

(54) MODEL SELECTION IN A FORECASTING PIPELINE TO OPTIMIZE TRADEOFF BETWEEN FORECAST ACCURACY AND COMPUTATIONAL COST

(71) Applicant: Intuit Inc., Mountain View, CA (US)

(72) Inventors: Sambarta Dasgupta, Sunnyvale, CA (US); Colin R. Dillard, Redwood City, CA (US); Shashank Shashikant Rao, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 631 days.

(21) Appl. No.: 16/688,945

(22) Filed: Nov. 19, 2019

(65) Prior Publication Data

US 2021/0150384 A1 May 20, 2021

(51) Int. Cl.
| | |
|---|---|
| G06F 16/24 | (2019.01) |
| G06N 5/04 | (2023.01) |
| G06F 16/2455 | (2019.01) |
| G06N 3/126 | (2023.01) |

(52) U.S. Cl.
CPC ......... G06N 5/04 (2013.01); G06F 16/24568 (2019.01); G06N 3/126 (2013.01)

(58) Field of Classification Search
CPC ................................................ G06F 16/24568
See application file for complete search history.

(56) References Cited

U.S. PATENT DOCUMENTS

| | | | |
|---|---|---|---|
| 4,914,603 A | 4/1990 | Wood | |
| 7,660,705 B1 | 2/2010 | Meek et al. | |
| 11,281,969 B1 * | 3/2022 | Rangapuram | ........ G06K 9/6256 |
| 2005/0222929 A1 | 10/2005 | Steier et al. | |
| 2008/0183648 A1 * | 7/2008 | Goldberg | ............... G06N 20/00 |
| | | | 706/13 |
| 2010/0332210 A1 | 12/2010 | Birdwell et al. | |
| 2014/0019448 A1 | 1/2014 | Leonard et al. | |
| 2014/0114897 A1 | 4/2014 | Nakamura et al. | |

(Continued)

FOREIGN PATENT DOCUMENTS

WO      2018085859 A1      5/2018

OTHER PUBLICATIONS

Hyndman, Rob J. et al., "Optimal combination forecasts for hierarchical time series," Computational Statistics & Data Analysis, vol. 55, No. 9, 2011, pp. 2579-2589.

(Continued)

*Primary Examiner* — Mohammad S Rostami
(74) *Attorney, Agent, or Firm* — Paradice & Li LLP (57) ABSTRACT

Systems and methods for forecasting future values of data streams are disclosed. One example method may include receiving information characterizing each of a plurality of forecasting models, retrieving historical data for each of a plurality of data streams, determining one or more constraints, dynamically selecting one of the plurality of forecasting models for each of the data streams based on accuracy metrics for the forecasting models, estimating cost metrics associated with each forecasting model, dynamically selecting the forecasting model based at least in part on the accuracy metrics, the cost metrics, and the determined constraints, and forecasting a first subsequent value of each data stream using the corresponding selected forecasting model.

16 Claims, 4 Drawing Sheets

(56) References Cited

U.S. PATENT DOCUMENTS

| | | | |
|---|---|---|---|
| 2015/0253463 A1* | 9/2015 | Narayanaswamy | G01W 1/10 702/3 |
| 2015/0254569 A1* | 9/2015 | Baughman | G06Q 10/04 706/52 |
| 2018/0046926 A1 | 2/2018 | Achin et al. | |
| 2018/0060738 A1 | 3/2018 | Achin et al. | |
| 2018/0060744 A1 | 3/2018 | Achin et al. | |
| 2018/0137522 A1 | 5/2018 | Modarresi et al. | |
| 2018/0150609 A1 | 5/2018 | Kim et al. | |
| 2018/0219889 A1 | 8/2018 | Oliner et al. | |
| 2018/0300737 A1* | 10/2018 | Bledsoe | G06F 16/2477 |
| 2018/0293462 A1 | 11/2018 | Ambati et al. | |
| 2019/0012684 A1 | 1/2019 | Cui et al. | |
| 2019/0122138 A1 | 4/2019 | Li et al. | |
| 2019/0122307 A1 | 4/2019 | Sayed | |
| 2019/0130256 A1 | 5/2019 | Ghahramani | |
| 2019/0228336 A1 | 7/2019 | Kanagawa et al. | |
| 2019/0258927 A1 | 8/2019 | Chen et al. | |
| 2020/0012886 A1 | 1/2020 | Walters et al. | |
| 2020/0090003 A1 | 3/2020 | Marques et al. | |
| 2020/0111109 A1 | 4/2020 | Lei et al. | |
| 2020/0242483 A1 | 6/2020 | Rao et al. | |
| 2020/0285503 A1* | 9/2020 | Dou | G06N 20/20 |
| 2020/0372431 A1* | 11/2020 | Okimoto | G06N 20/00 |
| 2021/0150257 A1 | 5/2021 | Dasgupta et al. | |
| 2022/0027082 A1* | 1/2022 | Okuyama | G06F 3/0655 |

OTHER PUBLICATIONS

Zhu, Lingxue et al., "Deep and confident prediction for time series at uber," Data Mining Workshops (ICDMW), 2017 IEEE International Conference on Data Mining Workshops, IEEE, 2017, 8 pages.

Laptev, Nikolay, et al., "Time-series extreme event forecasting with neural networks at uber," International Conference on Machine Learning, No. 34, 2017, 5 pages.

Barnhart, Cynthia, et al., "Branch-and-price: Column generation for solving huge integer programs," Operations Research, vol. 46, No. 3, 1998, pp. 316-329.

Bean, James C. "Genetic algorithms and random keys for sequencing and optimization." ORSA Journal on Computing, vol. 6, No. 2, 1994, pp. 154-160.

Talagala et al., "Meta-Learning How to Forecast Time Series", Monash University, Department of Econometrics and Business Statistics, Apr. 30, 2018.

* cited by examiner

| Data Stream | Scaled most recent forecast error | Time units since most recent training | Model $M_1$ expected accuracy | ... | Model $M_m$ expected accuracy |
|---|---|---|---|---|---|
| $S_1$ | 0.0001 | 5 | 0.005 | ... | 0.0001 |
| $S_2$ | 0.3 | 1 | 0.3 | ... | 0.9 |
| ... | ... | ... | ... | ... | ... |
| $S_N$ | 0.02 | 1 | 0.06 | ... | 0.01 |

| Forecasting Model | Average training time (sec.) | Average inference time (sec.) |
|---|---|---|
| $M_1$ | 0.06 | 0.02 |
| $M_2$ | 0.1 | 0.05 |
| ... | ... | ... |
| $M_m$ | 0.01 | 0.10 |

```
┌─────────────────────────────────────────────────────────────┐
│ Receive information characterizing each forecasting model   │
│ of a plurality of forecasting models. (402)                 │
└─────────────────────────────────────────────────────────────┘
                              │
                              ▼
┌─────────────────────────────────────────────────────────────┐
│ Retrieve historical data for each data stream of a plurality│
│ of data streams, the historical data including at least one │
│ or more previous values and a most recently used forecasting│
│ model for each data stream of the plurality of data streams.│
│ (404)                                                       │
└─────────────────────────────────────────────────────────────┘
                              │
                              ▼
┌─────────────────────────────────────────────────────────────┐
│ Determine one or more constraints on the forecasting system.│
│ (406)                                                       │
└─────────────────────────────────────────────────────────────┘
                              │
                              ▼
┌─────────────────────────────────────────────────────────────┐
│ For each data stream, dynamically select a forecasting model│
│ for each data stream of the plurality of data streams. (408)│
│                                                             │
│  ┌───────────────────────────────────────────────────────┐  │
│  │ Estimate an accuracy metric for each forecasting      │  │
│  │ model. (408a)                                         │  │
│  └───────────────────────────────────────────────────────┘  │
│                                                             │
│  ┌───────────────────────────────────────────────────────┐  │
│  │ Estimate one or more cost metrics associated with     │  │
│  │ each forecasting model. (408b)                        │  │
│  └───────────────────────────────────────────────────────┘  │
│                                                             │
│  ┌───────────────────────────────────────────────────────┐  │
│  │ Dynamically select a forecasting model based at least │  │
│  │ in part on the estimated accuracy metric, the one or  │  │
│  │ more estimated cost metrics, and the one or more      │  │
│  │ determined constraints. (408c)                        │  │
│  └───────────────────────────────────────────────────────┘  │
└─────────────────────────────────────────────────────────────┘
                              │
                              ▼
┌─────────────────────────────────────────────────────────────┐
│ Forecast a first subsequent value of each data stream using │
│ the corresponding selected forecasting model. (410)         │
└─────────────────────────────────────────────────────────────┘
```

FIG. 4

MODEL SELECTION IN A FORECASTING PIPELINE TO OPTIMIZE TRADEOFF BETWEEN FORECAST ACCURACY AND COMPUTATIONAL COST

TECHNICAL FIELD

This disclosure relates generally to methods for operating machine learning networks, and specifically to appropriately selecting, training, and applying forecasting models to time series data streams.

DESCRIPTION OF RELATED ART

Increasingly, individuals and businesses may plan activities and expenses using forecasted information. For example, an individual or business may forecast cashflows over time among one or more accounts. For another example, businesses may forecast flows of products over time through one or more industrial assembly lines, and may also forecast flows of products, ingredients, or other materials over time across one or more business locations, such as forecasting flows of raw materials across one or more assembly or manufacturing locations. Although such forecasting may be provided at scale using one or more machine learning systems, the computational resources needed to provide accurate forecasts of cashflows and flows of products using machine learning systems can be significant and, in some instances, may exceed the amount of computational resources available to a business or other entity.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for forecasting future values of data streams. The example method may be performed by one or more processors of a forecasting system and may include receiving information characterizing each forecasting model of a plurality of forecasting models, retrieving historical data for each data stream of a plurality of data streams, the historical data including at least one or more previous values and a most recently used forecasting model for each data stream of the plurality of data streams, determining one or more constraints on the forecasting system, dynamically selecting one of the plurality of forecasting models for each data stream of the plurality of data streams, and forecasting a first subsequent value of each data stream using the corresponding selected forecasting model. Dynamically selecting one of the plurality of forecasting models for each data stream of the plurality of data streams may include estimating an accuracy metric for each forecasting model, estimating one or more cost metrics associated with each forecasting model, and dynamically selecting the forecasting model of the plurality of forecasting models based at least in part on the estimated accuracy metric, the one or more estimated cost metrics, and the one or more determined constraints.

In some implementations, the historical data includes, for each data stream, a most recent training time. In some aspects, dynamically selecting the forecasting model includes, for each data stream, updating the most recent training time if the selected forecasting model has been trained for forecasting the first subsequent value.

In some implementations, the one or more determined constraints may include a maximum computational cost for forecasting future values of each data stream over a time horizon. In some implementations, the one or more determined constraints may include a constraint that only one forecasting model per data stream is to be used for forecasting the first subsequent value for each data stream. In some implementations, the one or more determined constraints may include a constraint that only the dynamically selected forecasting models are to be trained for forecasting the first subsequent values.

In some implementations, the one or more estimated cost metrics include an inference cost and a training cost, the inference cost representing a cost for forecasting a value of a data stream using a corresponding forecasting model, and the training cost representing a cost for training the corresponding forecasting model.

In some implementations, dynamically selecting the forecasting model includes jointly selecting the forecasting model for each data stream based at least in part on the estimated accuracy metric, the one or more estimated cost metrics, and the one or more determined constraints. In some implementations, dynamically selecting the forecasting model includes, for each data stream, training the selected forecasting model and updating the most recent training time for the selected forecasting model.

In some implementations, dynamically selecting the forecasting model includes solving an operations research (OR) resource allocation model for the decision variables $X_f(i, j, t)$ and $X_T(i, j, t)$, wherein $X_f(i, j, t)$ is a binary variable indicating whether or not to use the j-th forecasting model to forecast a value for the i-th data stream at the time t, and $X_T(i, j, t)$ is a binary variable indicating whether or not to train the j-th forecasting model for the i-th data stream at the time t. In some aspects the OR resource allocation model may be expressed as an ILP problem. In some aspects, the OR resource allocation model is solved using an integer programming algorithm or a genetic algorithm. In some aspects solving the OR resource allocation model comprises solving for the decision variables $X_f(i, j, t)$ and $X_T(i, j, t)$ which minimize $[\Sigma_{i,j}(-\theta_i(t) \cdot X_f(i, j, t) + c_T(j) \cdot X_f(i, j, t) + A(i, j, t) \cdot X_f(i, j, t)) + \Sigma_{i,j}(X_T(i, j, t) \cdot \Sigma_{k \in \alpha_k^{M(j)}}(y_k(t) - y_k(T(t, j, k)))^2)]$, where $\theta_i(t)$ is a forecast accuracy for the i-th data stream at the time t, $c_T(j)$ is a computational cost for training the j-th forecasting model, $A(i, j, t)$ is an estimated forecasting model accuracy for forecasting the i-th time series using the j-th forecasting model at the time t, $\alpha_k^{M(j)}$ is a set of indices of the time series which are used to train the j-th forecasting model $M(j)$, and $y_k(t)$ is a value of the k-th time series at the time t. In some aspects solving the OR resource allocation model is subject to conditions including $\Sigma_j X_f(i, j, t) = 1$ for each time t, $\Sigma_{i,k} c_T(j) \cdot X_T(k, j, t) + \Sigma_{i,j} c_f(j) \cdot X_f(i, j, t) \leq c_{max}$, $X_T(\alpha_k^{M(j)}, j, t) \leq X_f(i, j, t)$, for $i \in \alpha_k^{M(j)}$, and $T(t, j, \alpha_k^{M(j)}) = T(t-1, j, \alpha_k^{M(j)}) + X_T(\alpha_k^{M(j)}, j, t) \cdot (t - T(t-1, j, \alpha_k^{M(j)}))$.

Another innovative aspect of the subject matter described in this disclosure can be implemented in a system for forecasting future values of data streams. The system may include one or more processors and a memory storing instructions that, when executed by the one or more processors, causes the system to perform operations including receiving information characterizing each forecasting model of a plurality of forecasting models, retrieving historical data for each data stream of a plurality of data streams, the historical data including at least one or more previous values and a most recently used forecasting model for each data stream of the plurality of data streams, determining one or more constraints on the forecasting system, dynamically selecting one of the plurality of forecasting models for each data stream of the plurality of data streams, and forecasting a first subsequent value of each data stream using the corresponding selected forecasting model. Dynamically selecting one of the plurality of forecasting models for each data stream of the plurality of data streams may include estimating an accuracy metric for each forecasting model, estimating one or more cost metrics associated with each forecasting model, and dynamically selecting the forecasting model of the plurality of forecasting models based at least in part on the estimated accuracy metric, the one or more estimated cost metrics, and the one or more determined constraints.

Another innovative aspect of the subject matter described in this disclosure can be implemented in a non-transitory computer-readable medium storing instructions that, when executed by one or more processors of a computing device, cause the computing device to forecast future values of data streams by performing operations including receiving information characterizing each forecasting model of a plurality of forecasting models, retrieving historical data for each data stream of a plurality of data streams, the historical data including at least one or more previous values and a most recently used forecasting model for each data stream of the plurality of data streams, determining one or more constraints on the forecasting system, dynamically selecting one of the plurality of forecasting models for each data stream of the plurality of data streams, and forecasting a first subsequent value of each data stream using the corresponding selected forecasting model. Dynamically selecting one of the plurality of forecasting models for each data stream of the plurality of data streams may include estimating an accuracy metric for each forecasting model, estimating one or more cost metrics associated with each forecasting model, and dynamically selecting the forecasting model of the plurality of forecasting models based at least in part on the estimated accuracy metric, the one or more estimated cost metrics, and the one or more determined constraints.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Implementations of the subject matter described in this disclosure may be used to forecast future values of time series data streams using one or more forecasting models. In accordance with various aspects of the present disclosure, a forecasting system is disclosed that includes a plurality of forecasting models, each of which may have a different computational cost and may provide a different level of forecasting accuracy. In some implementations, the forecasting system receives a plurality of time series data streams, selects the forecasting model that achieves a desired optimal balance between forecasting accuracy and computational cost for each of the time series data streams, and then uses the selected forecasting models to forecast future values for each of the time series data streams. In some aspects, the forecasting model to be used for a given time series data stream may be selected based on an estimated accuracy with which each of the plurality of forecasting models can forecast future values of the given time series data stream, based on one or more costs associated with each of the plurality of forecasting models (such as implementation costs and training costs), based on one or more constraints (such as a total computational cost for forecasting a value of each data stream at a given time), or any combination thereof. In this way, forecasting systems disclosed herein can forecast future values of each of a plurality of time series data streams in a manner that achieves a desired balance between computational cost and accuracy.

Various implementations of the subject matter disclosed herein provide one or more technical solutions to the technical problem of dynamically selecting and applying forecasting models for each data stream of a plurality of time series data streams based on trade-offs between forecasting accuracy and computational cost constraints. More specifically, various aspects of the present disclosure provide a unique computing solution to a unique computing problem that did not exist prior to electronic or online forecasting systems that can forecast the time sequences with greater efficiency and accuracy and less time than conventional techniques. Such improvements allow a forecasting system to efficiently apply limited computational resources for forecasting values of each data stream. As such, implementations of the subject matter disclosed herein are not an abstract idea such as organizing human activity or a mental process that can be performed in the human mind. For example, in order to achieve the computational and temporal benefits of dynamically selecting the most appropriate forecasting model for use with each data stream, an electronic or online forecasting system must be used, as the benefits of efficient resource allocation require the speed and processing power of such a system in order to solve the relevant optimization problems discussed below.

Moreover, various aspects of the present disclosure effect an improvement in the technical field of dynamically selecting and applying forecasting models for each data stream of a plurality of time series data streams based on trade-offs between forecast accuracy and computational cost constraints. The dynamic selection of the most efficient forecasting model for each data stream at each time based on the forecast accuracies and computational cost constraints cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

Figure 1:
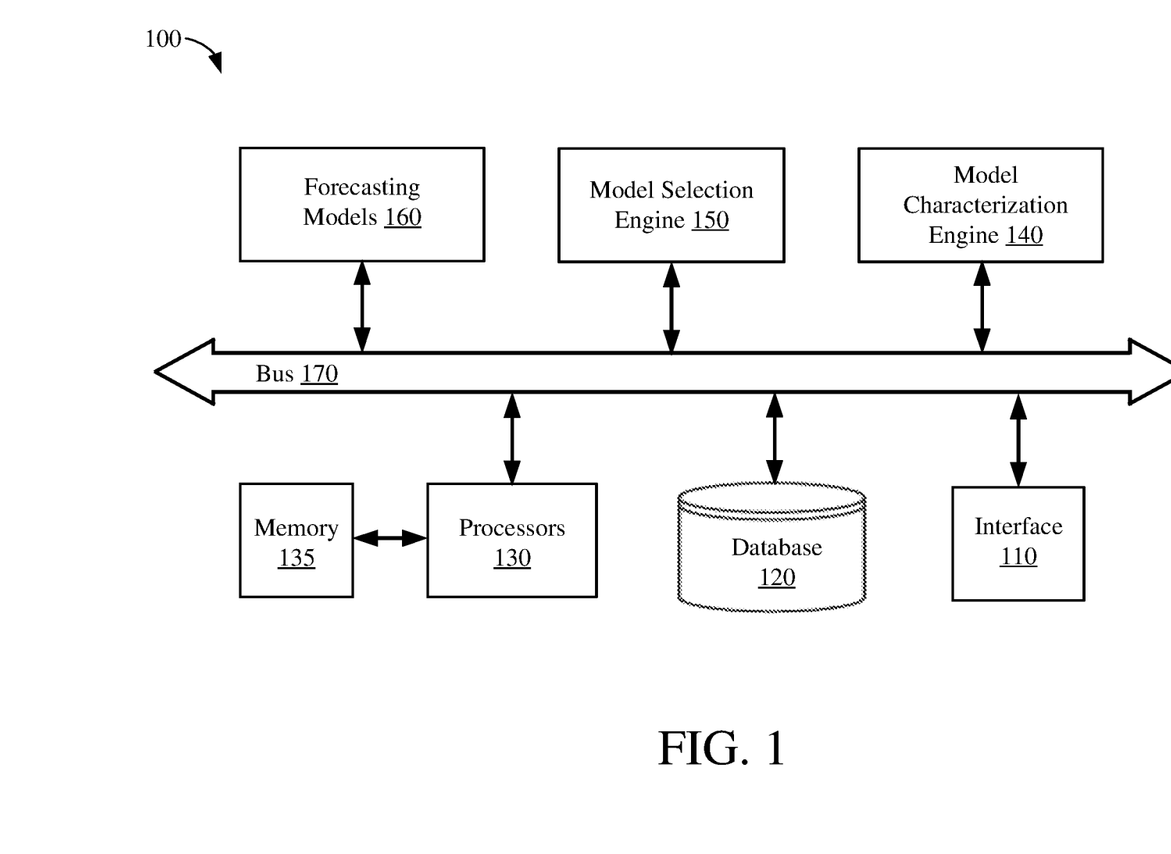
FIG. 1 shows an example forecasting system, according to some implementations.

FIG. 1 shows a forecasting system 100, according to some implementations. Various aspects of the forecasting system 100 disclosed herein may be applicable for forecasting time series data streams for which historical data is available. For example, the forecasting system 100 may be used for selecting and applying forecasting models for forecasting any time series data streams including cashflows among accounts, input or output flow for one or more industrial assembly lines, package flow through a delivery system, and so on.

The forecasting system 100 is shown to include an input/output (I/O) interface 110, a database 120, one or more data processors 130, a memory 135 coupled to the data processors 130, a model characterization engine 140, a model selection engine 150, and a plurality of forecasting models 160. In some implementations, the various components of the forecasting system 100 may be interconnected by at least a data bus 170, as depicted in the example of FIG. 1. In other implementations, the various components of the forecasting system 100 may be interconnected using other suitable signal routing resources.

The interface 110 may include a screen, an input device, and other suitable elements that allow a user to provide information to the forecasting system 100 and/or to retrieve information from the forecasting system 100. Example information that can be provided to the forecasting system 100 may include historical data for one or more data streams or one or more forecasting models. Example information that can be retrieved from the forecasting system 100 may include forecasted data for one or more data streams, such as forecasted data stream mean or standard deviation data, one or more sets of parameters for training one or more of the forecasting models, and the like.

The database 120, which may represent any suitable number of databases, may store any suitable information pertaining to each of a plurality of data streams associated with the forecasting system 100. For example, the information may include historical data about each of the plurality of data streams (such as historical data stream values, previously used forecasting models, and one or more historical forecasting error metrics), may include owner information for one or more of the plurality of data streams (such as phone numbers, email addresses, physical mailing address, SSNs, and so on), and may include related information (such as a type of data represented by each data stream, and so on). In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as transforming the data sets stored in the database 120 into forecasting information), may be one or more suitable processors capable of executing scripts or instructions of one or more software programs stored in the forecasting system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The model characterization engine 140 may be used to characterize the estimated performance of each of the plurality of forecasting models. For example, the model characterization engine 140 may store or determine one or more general computational costs associated with each forecasting model, such as a resource cost associated with training a forecasting model or a cost for inferring a single value of a data stream using the forecasting model. Further, the model characterization engine 140 may store specific information about a forecasting model as applied to a particular data stream. For example, such specific information may include an estimated accuracy metric associated with a forecasting model predicting a value of the particular data stream.

The model selection engine 150 may be used to select, for each data stream of the plurality of data streams, a forecasting model for use in forecasting a value of the data stream at a given time. In some implementations, the model selection engine 150 may jointly select a corresponding forecasting model for each data stream in light of a plurality of constraints, as discussed further below.

The forecasting models 160 may store any number of machine learning models that can be used to forecast values for one or more of the time series data streams. A machine learning model can take the form of an extensible data structure that can be used to represent sets of words or phrases and/or can be used to represent sets of attributes or features. The machine learning models may be seeded with historical account data indicating time series data stream values. In some implementations, the forecasting models 160 may include one or more deep neural networks (DNN), which may have any suitable architecture, such as a feed-forward architecture or a recurrent architecture. As discussed below, the forecasting models 160 may be trained using historical data, estimated forecasting model computational costs, and estimated forecasting accuracy.

The particular architecture of the forecasting system 100 shown in FIG. 1 is but one example of a variety of different architectures within which aspects of the present disclosure may be implemented. For example, in other implementations, the forecasting system 100 may not include a model selection engine 150, the functions of which may be implemented by the processors 130 executing corresponding instructions or scripts stored in the memory 135. In some other implementations, the functions of the model characterization engine 140 may be performed by the processors 130 executing corresponding instructions or scripts stored in the memory 135. Similarly, the functions of the forecasting models 160 may be performed by the processors 130 executing corresponding instructions or scripts stored in the memory 135.

Figure 2:
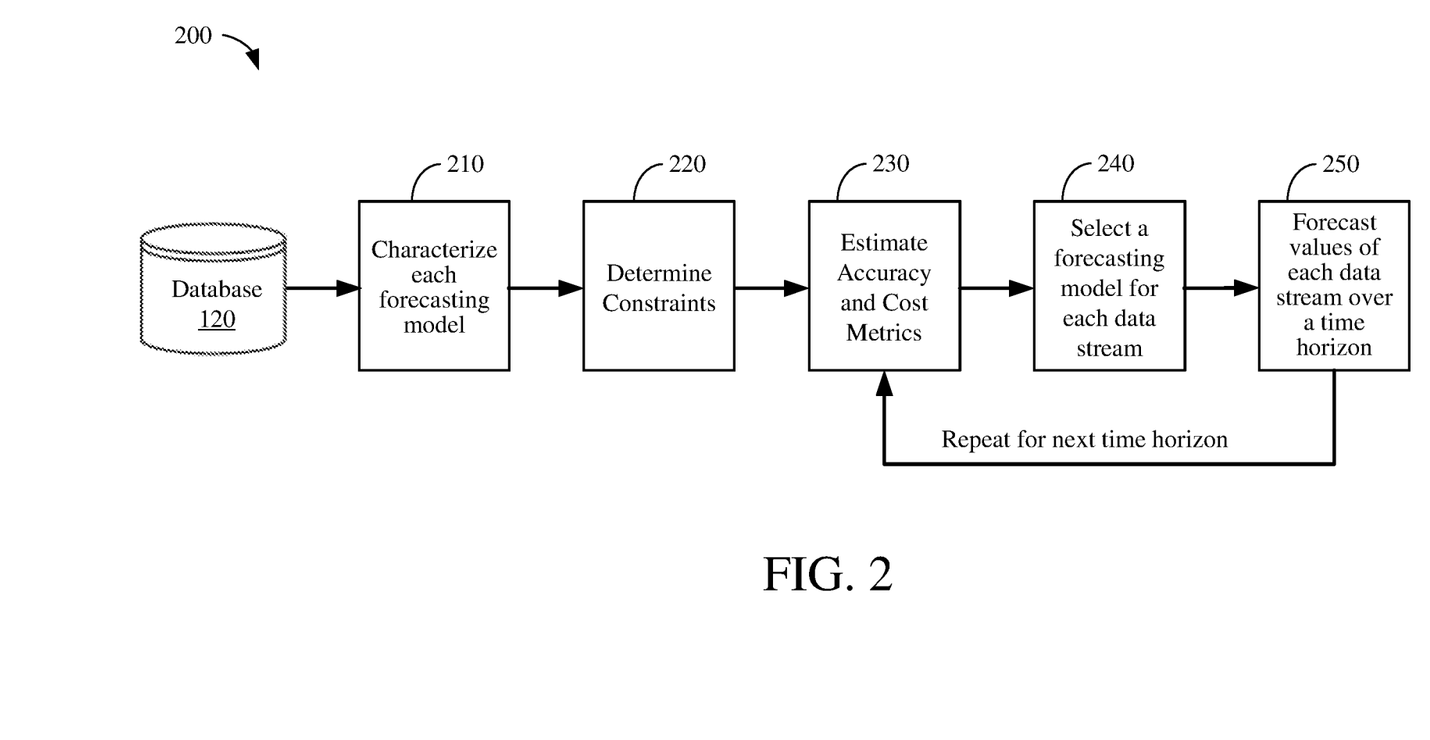
FIG. 2 shows an example process flow that may be employed by the forecasting system of FIG. 1, according to some implementations.

FIG. 2 shows a high-level overview of an example process flow 200 that may be employed by the forecasting system 100 of FIG. 1. In block 210, data streams and forecasting model information retrieved from the database 120 are used to characterize each forecasting model. Characterizing each forecasting model may include determining general information, such as one or more cost metrics associated with training and using a given forecasting model. One or more tables listing such general information may be generated. At block 220, one or more constraints on the forecasting model selection may be determined. At block 230, one or more accuracy metrics may be estimated for each data stream. Such accuracy metrics may include an estimated accuracy for forecasting a value of each data stream using each forecasting model. At block 240, a forecasting model may be selected for each data stream based on the estimated accuracy metrics, one or more estimated cost metrics, and the one or more constraints. At block 250, future values of each data stream may be forecasted over a time horizon using the corresponding selected forecasting metrics. In some implementations, the example process flow 200 may include training one or more of the selected forecasting metrics using training data for the corresponding data stream before forecasting the future values of the corresponding data stream.

As shown with respect to FIG. 2, the blocks 230, 240, and 250 may be repeated for one or more subsequent time horizons for which forecasted values of each of the data streams are desired. For example, if the time series data streams are to be predicted on a daily basis, the blocks 230, 240, and 250 may be repeated for forecasting the next day's value for each of the plurality of data streams. This recurring generation of forecasted values may be referred to as a forecast pipeline. Further, while not shown in FIG. 2 for simplicity, when determining forecasts for subsequent times, the forecasting system 100 may receive an updated value of each data stream and may compare these updated values to corresponding predicted values for estimating the accuracy metrics in block 230.

As discussed above, selecting an appropriate forecasting model for forecasting time series data for a plurality of data streams is beneficial for ensuring efficient use of scarce computing resources in light of estimated forecasting accuracy and relevant constraints. Multiple forecasting models may be supported by an example forecasting system 100, such as Autoregressive Integrated Moving Average (ARIMA) based forecasting models, Exponential Smoothing (ETS) based forecasting models, one or more forecasting models incorporating recurrent neural networks, one or more forecasting models based on State Space Models, one or more forecasting models based on Component Decomposition Models, and so on. However, each of these forecasting models may have different characteristics. For example, each forecasting model may have a different computational cost, such as a different cost to train the forecasting model, and a cost for inferring or forecasting a future value of a data stream. Further, each forecasting model may have a different estimated accuracy for forecasting a value of a given data stream. Thus, the example implementations may allow the forecasting system 100 to select a forecasting model for each data stream based on an accuracy metric, based on the estimated accuracy of each forecasting model, and based on the computational costs of each forecasting model. In addition, or in the alternative, the forecasting system 100 may be subject to one or more constraints. For example, there may be a limited amount of total computational resources which may be used for forecasting values of each data stream over a specified time, such as over a time horizon. Other constraints may relate to how the forecasting models may be selected, or when they are to be trained, as discussed further below.

Because example forecasting systems may concurrently forecast values of large numbers of data streams, for example, numbering in the tens or hundreds of thousands (or more), efficient solutions are required to select and apply appropriate forecasting models for each data stream. In some implementations, the forecasting system 100 may use integer linear programming (ILP), which is a type of operations research (OR) model, to select the appropriate forecasting model for each data stream based on the aforementioned constraints, estimated accuracy metrics, and cost metrics.

As discussed above, the accuracy metric for forecasting a value of a given data stream using each forecasting model may be an important consideration when selecting forecasting models for each data stream. In accordance with the example implementations, the accuracy metric may be an estimated forecasting error, such as a most recent estimated forecasting error. Such an estimated forecasting error may be determined in any of multiple ways. In some aspects, each data stream may be split into a training set and a validation set, where the forecasting models are trained on the training set, and the trained forecasting models are used to forecast values of the validation set.

The accuracy metric may be based on the forecasting error of such a validation. In some aspects, the accuracy metric may be computed as a log-likelihood score, a root mean-squared error (RMSE), a mean absolute scaled error (MASE), or another suitable error measurement. In some implementations, the accuracy metric may be normalized, so that the accuracy metrics may be compared among multiple data streams. For example, a trivial predictor may be determined based on the statistics of the historical values of a data stream, such as based on the mean and/or the median of such statistics or based on an empirical distribution of the training data. A normalized accuracy metric for a given forecasting model may be determined based on the accuracy metric for the given forecasting model and on the same accuracy metric corresponding to the trivial predictor. For example, a ratio between the accuracy metric for the given forecasting model and the accuracy metric for the trivial predictor may be such a normalized accuracy metric.

In some implementations, the accuracy metric may be determined for one or more groups of data streams. For example a group of data streams may include a number of data streams having common characteristics, such that the accuracy metric may be estimated for the group of data streams rather than for each data stream separately. Such consolidation may reduce the computational resources required for determining the accuracy metrics for the plurality of data streams by reducing the number of accuracy metrics which are determined.

After estimating the accuracy metrics, the accuracy metrics may subsequently be updated. For example, after selecting and applying the forecasting models for each data stream to determine a forecasted value for each data stream, a subsequent forecasting error may be determined and used for updating the accuracy metrics. In some implementations, the accuracy metrics may be recalculated recurrently, that is, with each pass through the forecasting pipeline. In some other implementations, the accuracy metrics may be recalculated after a specified period of time. For example, the values of the data streams may be forecasted daily, while the accuracy metrics may be recalculated weekly, monthly, or at another appropriate time period.

In addition to the accuracy metrics, the forecasting system 100 may determine information relating to training of forecasting models. For example, for each data stream, information may be determined and stored about when forecasting model training was most recently performed. When training is performed for a given data stream, such information may be updated.

As discussed above, each forecasting model may have different cost metrics. For example, each forecasting model may be associated with a specified cost for training the forecasting model, and a specified cost for inferring or forecasting a value of a data stream using the forecasting model. In some implementations, the cost may be a computational cost, such as an amount of processing resources or time required for performing the corresponding action.

Figure 3A:
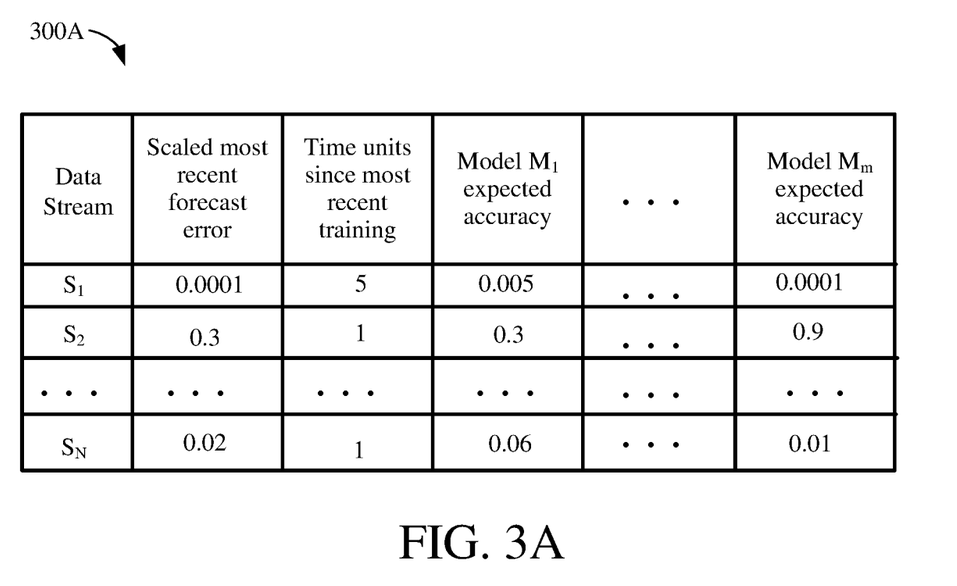
FIG. 3A shows an example data stream information table, according to some implementations.

FIG. 3A shows an example data stream information table 300A, according to some implementations. The data stream information table 300A shows one form in which relevant metrics for each data stream may be stored. More particularly, for each data stream $S_1$-$S_N$, a scaled most recent forecast error, a number of time units elapsed since the most recent forecasting model training, and a normalized estimated forecasting model accuracy for each of the plurality of forecasting models $M_1$-$M_m$ may be stored in the table 300A.

Figure 3B:
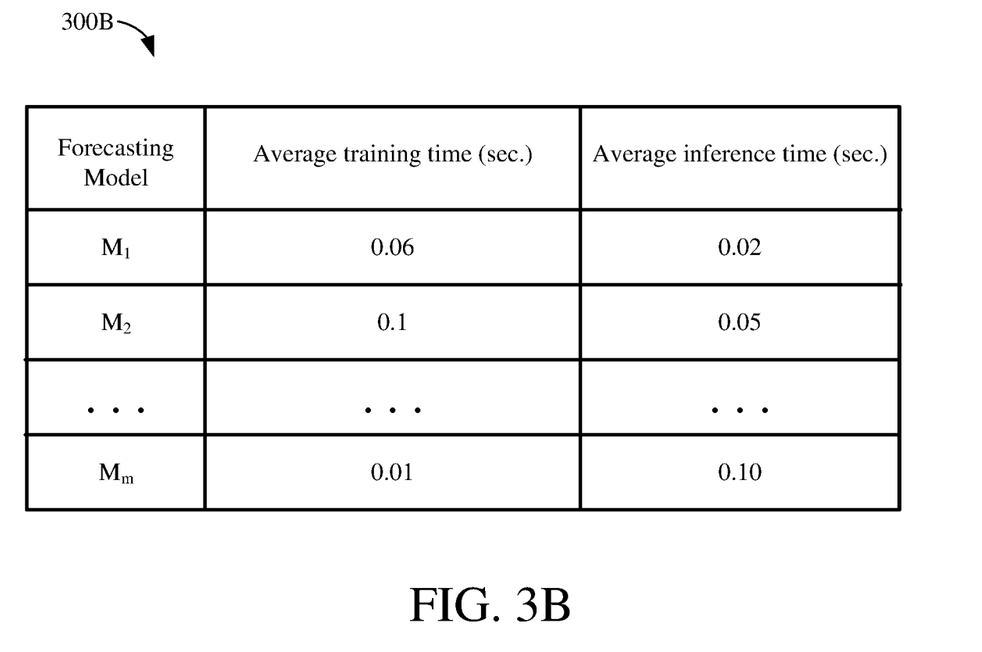
FIG. 3B shows an example forecasting model information table, according to some implementations.

FIG. 3B shows an example forecasting model information table 300B, according to some implementations. The forecasting model information table 300B shows one form in which relevant metrics for each forecasting model may be stored. More particularly, for each forecasting model $M_1$-$M_m$, cost metrics may be stored, such as an average training time and an average inference time. As discussed above, the average training time and average inference time may be example cost metrics associated with each forecasting model.

As discussed above, the forecasting system 100 may dynamically select appropriate forecasting models for each data stream by forming the model selection problem as an integer linear programming (ILP) problem, which is a type of operations research (OR) model. More particularly, the forecasting system 100 may form the forecasting model selection problem as an ILP, which accounts for the constraints, estimated accuracy metrics, and estimated cost metrics. Some example implementations present this problem as solving for two decision variables, $X_f(i, j, t)$ and $X_T(i, j, t)$, wherein $X_f(i, j, t)$ is a binary variable indicating whether or not to use the j-th forecasting model to forecast a value for the i-th data stream at the time t, and $X_T(i, j, t)$ is a binary variable indicating whether or not to train the j-th forecasting model for the i-th data stream at the time t. Thus, for example, $X_f(i, j, t)$ may have a first value (such as 0 or 1) when the j-th forecasting model is selected to be used for inferring the i-th data stream at the time t, and a second value when the j-th model is not selected to be used for inferring the i-th data stream at the time t.

The decision variables $X_f(i, j, t)$ and $X_T(i, j, t)$ may be incorporated into an OR model which is to solve for the $X_f(i, j, t)$ and $X_T(i, j, t)$ which minimize $$[\Sigma_{i,j}(-\theta_i(t) \cdot X_f(i,j,t) + c_T(j) \cdot X_T(i,j,t) + A(i,j,t) \cdot X_f(i,j,t)) + \Sigma_{i,j}(X_T(i,j,t) \cdot \Sigma_{k \in \alpha_k^{M(j)}}(y_k(t) - y_k(T(t,j,k))^2))]$$

In the above OR model, $\theta_i(t)$ is a forecast accuracy for the i-th data stream at the time t, such as the scaled most recent forecast error in FIG. 3A. Further, $c_T(j)$ is a computational cost for training the j-th forecasting model, such as the average training time in FIG. 3B. $A(i, j, t)$ is an estimated forecasting model accuracy for forecasting the i-th time series using the j-th forecasting model at the time t, such as the normalized estimated forecast accuracy in FIG. 3A. Further, $\alpha_k^{M(j)}$ is a set of indices of the time series which are used to train the j-th forecasting model $M(j)$, such as the indices of the training set of the data streams, discussed above. Finally, $y_k(t)$ is a value of the k-th time series at the time t.

Further, the above OR model is subject to constraints. One such constraint is that a total computational cost for forecasting one or more values for each data stream is less than a maximum computational cost. Such a constraint may be expressed as $\Sigma_{i,k} c_T(j) \cdot X_T(k, j, t) + \Sigma_{i,j} c_f(j) \cdot X_f(i, j, t) \leq c_{max}$, where $c_{max}$ is the maximum computational cost. Another constraint may be that only one forecasting model is to infer or forecast a value of a given data stream at a given time. Such a constraint may be expressed as $\Sigma_j X_f(i, j, t) = 1$ for each time t. Another constraint may be that a forecasting model is only to be trained if it is selected to infer or forecast a value of the corresponding data stream. Such a constraint may be expressed as $X_T(\alpha_k^{M(j)}, j, t) \leq X_f(i, j, t)$, for $i \in \alpha_k^{M(j)}$. Finally, the OR model may be subject to a constraint that the most recent training time is updated after a model is trained. Such a constraint may be expressed as $T(t, j, \alpha_k^{M(j)}) = T(t-1, j, \alpha_k^{M(j)}) + X_T(\alpha_k^{M(j)}, j, t) \cdot (t - T(t-1, j, \alpha_k^{M(j)}))$.

In some implementations, the maximum computational cost may be a maximum computational cost for forecasting values of all of the data streams over a time horizon. A time horizon may also be called a planning horizon and may be a fixed point in the future at which forecasting processes may be evaluated. In some implementations, the time horizon may be a specified time period, such as a number of days, weeks, months, or years. In some other implementations the time horizon may be a specified number of forecasted values for each data stream.

In accordance with the example implementations, after determining the relevant parameters, and expressing the forecasting model selection problem as an Integer Programming problem, which is a special variety of OR models, appropriate algorithms may be used to solve for the decision variables $X_f(i, j, t)$ and $X_T(i, j, t)$. For example, discrete optimization algorithms like genetic algorithms, Brunch and Bound, Brunch and Cut may be employed for solving this Integer Programming problem, after it has been appropriately constructed.

Figure 4:
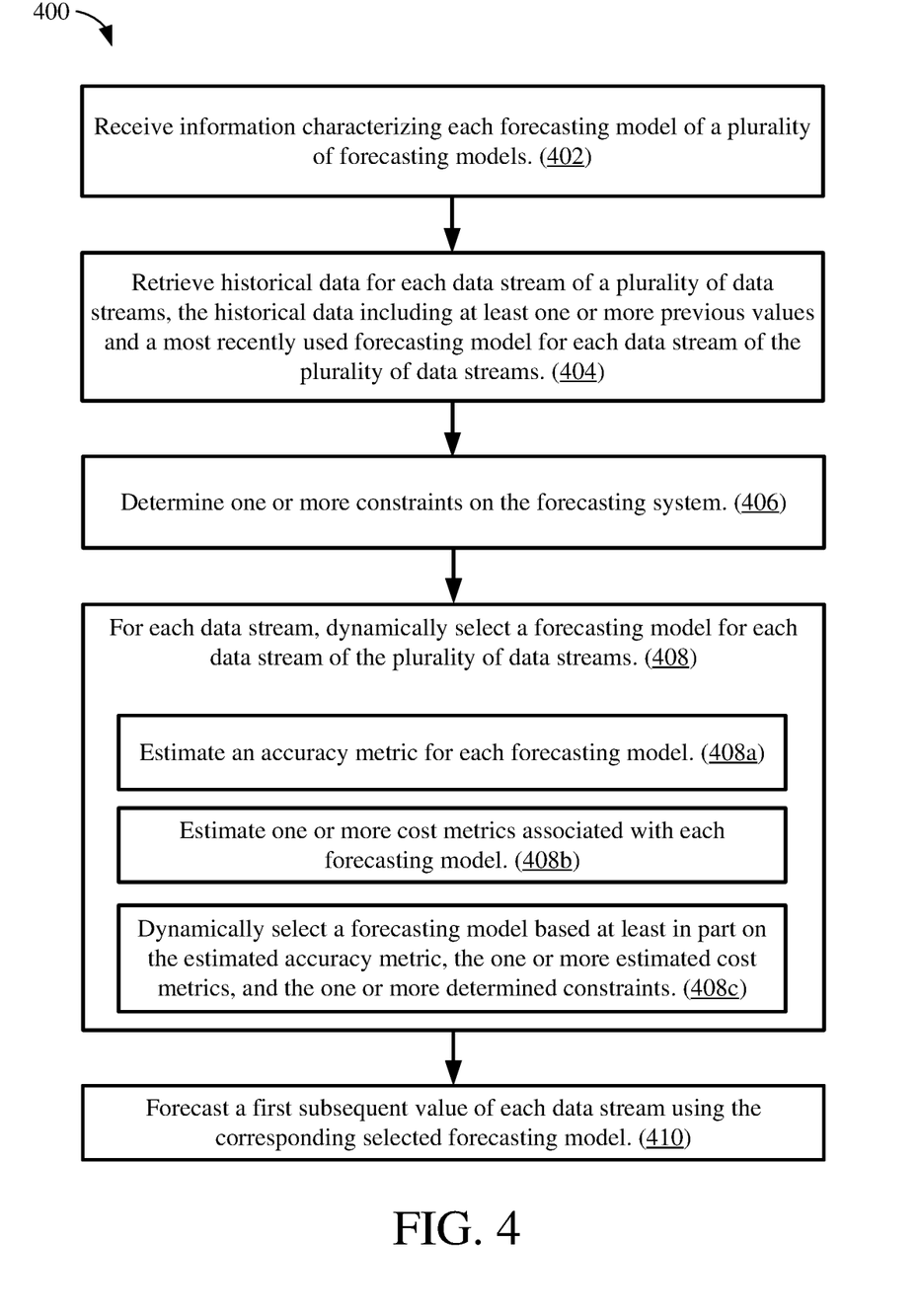
FIG. 4 shows an illustrative flow chart depicting an example operation for forecasting future values of data streams, according to some implementations.

FIG. 4 shows an illustrative flow chart depicting an example operation 400 for forecasting future values of data streams, according to some implementations. The example operation 400 may be performed by one or more processors of a forecasting system. In some implementations, the example operation 400 may be performed using the forecasting system 100 of FIG. 1. It is to be understood that the example operation 400 may be performed by any suitable systems, computers, or servers.

At block 402, the forecasting system 100 receives information characterizing each forecasting model of a plurality of forecasting models. At block 404 the forecasting system 100 retrieves historical data for each data stream of a plurality of data streams. The historical data includes at least one or more previous values and a most recently used forecasting model for each data stream of the plurality of data streams. At block 406, the forecasting system 100 determines one or more constraints on the forecasting system. At block 408, the forecasting system 100 dynamically selects a forecasting model for each data stream. Dynamically selecting the forecasting model may include performing blocks 408a-408c for each data stream. At block 408a, the forecasting system 100 estimates an accuracy metric for each forecasting model. At block 408b the forecasting system 100 estimates one or more cost metrics associated with each forecasting model. At block 408c the forecasting system 100 dynamically selects a forecasting model based at least in part on the estimated accuracy metric, the one or more estimated cost metrics, and the one or more determined constraints. At block 410 the forecasting system 100 forecasts a first subsequent value for each data stream using the corresponding selected forecasting model.

In some implementations, the historical data retrieved in block 404 includes, for each data stream, a most recent training time. In some aspects, dynamically selecting the forecasting model in block 408c includes, for each data stream, updating the most recent training time if the selected forecasting model has been trained for forecasting the first subsequent value.

In some implementations, the one or more constraints determined in block 406 may include a maximum computational cost for forecasting future values of each data stream over a time horizon. In some implementations, the one or more constraints determined in block 406 may include a constraint that only one forecasting model per data stream is to be used for forecasting the first subsequent value for each data stream. In some implementations, the one or more constraints determined in block 406 may include a constraint that only the dynamically selected forecasting models are to be trained for forecasting the first subsequent values.

In some implementations, the one or more cost metrics estimated in block 408b include an inference cost and a training cost, the inference cost representing a cost for forecasting a value of a data stream using a corresponding forecasting model, and the training cost representing a cost for training the corresponding forecasting model.

In some implementations, dynamically selecting the forecasting model in block 408c includes jointly selecting the forecasting model for each data stream based at least in part on the estimated accuracy metric, the one or more estimated cost metrics, and the one or more determined constraints. In some implementations, dynamically selecting the forecasting model in block 408c includes, for each data stream, training the selected forecasting model and updating the most recent training time for the selected forecasting model.

In some implementations, dynamically selecting the forecasting model in block 408c includes solving an operations research (OR) resource allocation model for the decision variables $X_f(i, j, t)$ and $X_T(i, j, t)$, wherein $X_f(i, j, t)$ is a binary variable indicating whether or not to use the j-th forecasting model to forecast a value for the i-th data stream at the time t, and $X_T(i, j, t)$ is a binary variable indicating whether or not to train the j-th forecasting model for the i-th data stream at the time t. In some aspects the OR resource allocation model may be expressed as an ILP problem. In some aspects, the OR resource allocation model is solved using an integer programming algorithm or a genetic algorithm. In some aspects solving the OR resource allocation model comprises solving for the decision variables $X_f(i, j, t)$ and $X_T(i, j, t)$ which minimize $[\Sigma_{i,j}(-\theta_i(t) \cdot X_f(i, j, t) + c_T(j) \cdot X_T(i, j, t) + A(i, j, t) \cdot X_f(i, j, t)) + \Sigma_{i,j}(X_T(i, j, t) \cdot \Sigma_{k \in \alpha_k^{M(j)}}(y_k(t) - y_k(T(t, j, k)))^2)]$, where $\theta_i(t)$ is a forecast accuracy for the i-th data stream at the time t, $c_T(j)$ is a computational cost for training the j-th forecasting model, $A(i, j, t)$ is an estimated forecasting model accuracy for forecasting the i-th time series using the j-th forecasting model at the time t, $\alpha_k^{M(j)}$ is a set of indices of the time series which are used to train the j-th forecasting model M(j), and $y_k(t)$ is a value of the k-th time series at the time t. In some aspects solving the OR resource allocation model is subject to conditions including $\Sigma_j X_f(i, j, t) = 1$ for each time t, $\Sigma_{i,k} c_T(j) \cdot X_T(k, j, t) + \Sigma_{i,j} c_f(j) \cdot X_f(i, j, t) \leq c_{max}$, $X_T(\alpha_k^{M(j)}, j, t) \leq X_f(i, j, t)$, for $i \in \alpha_k^{M(j)}$), and $T(t, j, \alpha_k^{M(j)}) = T(t-1, j, \alpha_k^{M(j)}) + X_T(\alpha_k^{M(j)}, j, t) \cdot (t - T(t-1, j, \alpha_k^{M(j)}))$.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method for forecasting future values of data streams, the method performed by one or more processors of a forecasting system and comprising:
   receiving information characterizing each forecasting model of a plurality of forecasting models;
   retrieving historical data for each data stream of a plurality of data streams, the historical data including at least one or more previous values and a most recently used forecasting model for each data stream of the plurality of data streams;
   determining one or more constraints on the forecasting system;
   dynamically selecting one of the plurality of forecasting models for each data stream of the plurality of data streams by:
      estimating an accuracy metric for each forecasting model;
      estimating one or more cost metrics associated with each forecasting model; and
      dynamically selecting the forecasting model of the plurality of forecasting models based at least in part on the estimated accuracy metric, the one or more estimated cost metrics, and the one or more determined constraints, wherein dynamically selecting the forecasting model for each data stream further comprises solving an operations research (OR) resource allocation model for the decision variables $X_f(i, j, t)$ and $X_T(i, j, t)$, wherein $X_f(i, j, t)$ is a binary variable indicating whether or not to use the j-th forecasting model to forecast a value for the i-th data stream at the time t, and $X_T(i, j, t)$ is a binary variable indicating whether or not to train the j-th forecasting model for the i-th data stream at the time t; and
   forecasting a first subsequent value of each data stream using the corresponding selected forecasting model;
   wherein solving the OR resource allocation model comprises solving for the decision variables $X_f(i, j, t)$ and $X_T(i, j, t)$ which minimize $[\Sigma_{i,j}(-\theta_i(t) \cdot X_f(i, j, t) + c_T(j) \cdot X_T(i, j, t) + A(i, j, t) \cdot X_f(i, j, t)) + \Sigma_{i,j}(X_T(i, j, t) \cdot \Sigma_{k \in \alpha_k^{M(j)}}(y_k(t) - y_k(T(t, j, k))^2)]$, wherein:
   $\theta_i(t)$ is a forecast accuracy for the i-th data stream at the time t;
   $c_T(j)$ is a computational cost for training the j-th forecasting model;
   $A(i, j, t)$ is an estimated forecasting model accuracy for forecasting the i-th time series using the j-th forecasting model at the time t;
   $\alpha_k^{M(j)}$ is a set of indices of the time series which are used to train the j-th forecasting model M(j); and
   $y_k(t)$ is a value of the k-th time series at the time t.

2. The method of claim 1, wherein the one or more constraints include a maximum computational cost for forecasting future values of each data stream over a time horizon.

3. The method of claim 1, wherein dynamically selecting the forecasting model further comprises jointly selecting the forecasting models for the plurality of data streams based at least in part on the accuracy metric, the one or more cost metrics, and the one or more constraints.

4. The method of claim 1, wherein the one or more cost metrics associated with a respective forecasting model of the plurality of forecasting models comprises an inference cost representing a cost for forecasting the value of a data stream using the respective forecasting model and a training cost representing a cost for training the respective forecasting model.

5. The method of claim 4, wherein the one or more constraints comprises a constraint that only the dynamically selected forecasting models are to be trained for forecasting the values.

6. The method of claim 1, wherein the one or more constraints comprises a constraint that only one forecasting model per data stream is to be used for forecasting the first subsequent value of data stream of the plurality of data streams.

7. The method of claim 1, wherein the historical data includes, for each data stream, a most recent training time.

8. The method of claim 7, wherein dynamically selecting the forecasting model further comprises, for each data stream, updating the most recent training time if the selected forecasting model has been trained for forecasting the first subsequent value.

9. The method of claim 8, wherein dynamically selecting the forecasting model further comprises, for each data stream, training the selected forecasting model and updating the most recent training time for the selected forecasting model.

10. The method of claim 1, wherein the OR resource allocation model is solved using an integer programming algorithm or a genetic algorithm.

11. The method of claim 1, wherein solving the OR resource allocation model is subject to conditions comprising:

$\Sigma_j X_f(i,j,t) = 1$ for each time $t$ and each value of $i$;

$\Sigma_{i,k} c_T(j) \cdot X_T(k,j,t) + \Sigma_{i,j} c_I(j) \cdot X_f(i,j,t) \leq c_{max}$;

$X_T(\alpha_k^{M(j)}, j, t) \leq X_f(i,j,t)$, for $i \in \alpha_k^{M(j)}$; and $T(t, j, \alpha_k^{M(j)}) = T(t-1, j, \alpha_k^{M(j)}) + X_T(\alpha_k^{M(j)}, j, t) \cdot (t - T(t-1, j, \alpha_k^{M(j)}))$.

12. A system for forecasting future values of data streams, the system comprising:
   one or more processors; and
   a memory storing instructions that, when executed by the one or more processors, causes the system to perform operations comprising:
      receiving information characterizing each forecasting model of a plurality of forecasting models;
      retrieving historical data for each data stream of a plurality of data streams, the historical data including at least one or more previous values and a most recently used forecasting model for each data stream of the plurality of data streams;
      determining one or more constraints on the forecasting system;

dynamically selecting one of the plurality of forecasting models for each data stream of the plurality of data streams by:
estimating an accuracy metric for each forecasting model;
estimating one or more cost metrics associated with each forecasting model; and
dynamically selecting the forecasting model of the plurality of forecasting models based at least in part on the estimated accuracy metrics, the one or more estimated cost metrics, and the one or more determined constraints, wherein dynamically selecting the forecasting model for each data stream further comprises solving an operations research (OR) resource allocation model for the decision variables $X_f(i, j, t)$ and $X_T(i, j, t)$, wherein $X_f(i, j, t)$ is a binary variable indicating whether or not to use the j-th forecasting model to forecast a value for the i-th data stream at the time t, and $X_T(i, j, t)$ is a binary variable indicating whether or not to train the j-th forecasting model for the i-th data stream at the time t; and
forecasting a first subsequent value of each data stream using the corresponding selected forecasting model;
wherein solving the OR resource allocation model comprises solving for the decision variables $X_f(i, j, t)$ and $X_T(i, j, t)$ which minimize $[\Sigma_{i,j}(-\theta_i(t)\cdot X_f(i, j, t) + c_T(j)\cdot X_f(i, j, t) + A(i, j, t)\cdot X_f(i, j, t)) + \Sigma_{i,j}(X_T(i, j, t)\cdot \Sigma_{k\in\alpha_k^{M(j)}}(y_k(t) - y_k(T(t, j, k))^2)]$, wherein:
$\theta_i(t)$ is a forecast accuracy for the i-th data stream at the time t;
$c_T(j)$ is a computational cost for training the j-th forecasting model;
$A(i, j, t)$ is an estimated forecasting model accuracy for forecasting the i-th time series using the j-th forecasting model at the time t;
$\alpha_k^{M(j)}$ is a set of indices of the time series which are used to train the j-th forecasting model $M(j)$; and
$y_k(t)$ is a value of the k-th time series at the time t.

13. The system of claim 12, wherein the one or more constraints comprises a maximum computational cost for forecasting future values of each data stream over a time horizon.

14. The system of claim 12, wherein dynamically selecting the forecasting model further comprises jointly selecting the forecasting models for the plurality of data streams based at least in part on the estimated accuracy metrics, the one or more estimated cost metrics, and the one or more determined constraints.

15. The system of claim 12, wherein the one or more cost metrics associated with a respective forecasting model of the plurality of forecasting models comprises an inference cost representing a cost for forecasting the value of a data stream using the respective forecasting model and a training cost representing a cost for training the respective forecasting model.

16. A non-transitory computer-readable medium storing instructions that, when executed by one or more processors of a computing device, cause the computing device to forecast future values of data streams by performing operations comprising:
receiving information characterizing each forecasting model of a plurality of forecasting models;
retrieving historical data for each data stream of the plurality of data streams, the historical data including at least one or more previous values and a most recently used forecasting model for each data stream of the plurality of data stream;
determining one or more constraints on the forecasting system;
dynamically selecting one of the plurality of forecasting models for each data stream of the plurality of data streams by:
estimating an accuracy metric for each forecasting model;
estimating one or more cost metrics associated with each forecasting model; and
dynamically selecting the forecasting model of the plurality of forecasting models based at least in part on the estimated accuracy metrics, the one or more estimated cost metrics, and the one or more determined constraints, wherein dynamically selecting the forecasting model for each data stream further comprises solving an operations research (OR) resource allocation model for the decision variables $X_f(i, j, t)$ and $X_T(i, j, t)$, wherein $X_f(i, j, t)$ is a binary variable indicating whether or not to use the j-th forecasting model to forecast a value for the i-th data stream at the time t, and $X_T(i, j, t)$ is a binary variable indicating whether or not to train the j-th forecasting model for the i-th data stream at the time t; and
forecasting a first subsequent value of each data stream using the corresponding selected forecasting model;
wherein solving the OR resource allocation model comprises solving for the decision variables $X_f(i, j, t)$ and $X_T(i, j, t)$ which minimize $[\Sigma_{i,j}(-\theta_i(t)\cdot X_f(i, j, t) + c_T(j)\cdot X_f(i, j, t) + A(i, j, t)\cdot X_f(i, j, t)) + \Sigma_{i,j}(X_T(i, j, t)\cdot \Sigma_{k\in\alpha_k^{M(j)}}(y_k(t) - y_k(T(t, j, k))^2)]$, wherein:
$\theta_i(t)$ is a forecast accuracy for the i-th data stream at the time t;
$c_T(j)$ is a computational cost for training the j-th forecasting model;
$A(i, j, t)$ is an estimated forecasting model accuracy for forecasting the i-th time series using the j-th forecasting model at the time t;
$\alpha_k^{M(j)}$ is a set of indices of the time series which are used to train the j-th forecasting model $M(j)$; and
$y_k(t)$ is a value of the k-th time series at the time t.

* * * * *